United States Patent [19]
Clark et al.

[11] Patent Number: 5,550,661
[45] Date of Patent: Aug. 27, 1996

[54] OPTICAL PHASE RETARDATION FILM

[75] Inventors: Terri R. Clark; Thomas C. Long, both of Morristown, N.J.

[73] Assignee: AlliedSignal Inc., Morris Township, N.J.

[21] Appl. No.: 153,114

[22] Filed: Nov. 15, 1993

[51] Int. Cl.$^6$ .................................................. G02F 1/1335
[52] U.S. Cl. .................................... 359/073; 359/63
[58] Field of Search .................................. 359/73, 63

[56] References Cited

U.S. PATENT DOCUMENTS

| | | |
|---|---|---|
| 4,239,349 | 12/1980 | Scheffer . |
| 4,385,806 | 5/1983 | Fergason . |
| 4,443,065 | 4/1984 | Funada et al. . |
| 4,711,530 | 12/1987 | Nakanowatari et al. . |
| 4,844,569 | 7/1989 | Wada et al. . |
| 4,889,412 | 12/1989 | Clerc et al. . |
| 4,957,349 | 9/1990 | Clerc et al. . |
| 5,061,042 | 10/1991 | Nakamura et al. .............. 359/73 |
| 5,067,799 | 11/1991 | Gold et al. . |
| 5,093,739 | 3/1992 | Aida et al. . |
| 5,107,356 | 4/1992 | Castleberry . |
| 5,121,238 | 6/1992 | Osabe . |
| 5,124,824 | 6/1992 | Kozaki et al. . |
| 5,138,474 | 8/1992 | Arakawa . |
| 5,150,235 | 9/1992 | Haim et al. . |
| 5,179,456 | 1/1993 | Aizawa et al. . |
| 5,189,538 | 2/1993 | Arakawa . |
| 5,245,456 | 9/1993 | Yoshimi et al. . |
| 5,247,379 | 9/1993 | Miller . |
| 5,249,071 | 9/1993 | Yoshimizu et al. . |
| 5,326,496 | 7/1994 | Iida et al. ....................... 359/73 |

FOREIGN PATENT DOCUMENTS

| | | |
|---|---|---|
| 0297841 | 1/1989 | European Pat. Off. . |
| 0347063 | 12/1989 | European Pat. Off. . |
| 0376696 | 4/1990 | European Pat. Off. . |
| 0481489 | 4/1992 | European Pat. Off. . |

OTHER PUBLICATIONS

Choy et al., "Dielectric Anisotropy in Oriented Poly(chlorotrifluoroethylene)", Journal of Polymer Science, Polymer Physics Edition, vol. 19, New York, pp. 991–1002 (1981).

Hashimoto, et al., "Crystal and Amorphous Orientation Behavior of Poly(chlorotrifluoroethylene) Films in Relation to Crystalline Superstructure", Journal of Polymer Science, Polymer Physics Edition, vol. 16, New York, pp. 271–288 (1978).

T. Nagatsuka et al., "Retardation Film for LCDs", Proceedings of the Sid, vol. 32/2, 125–131 (1991).

A. Lien et al., "19.2: Two–Domain TN–LCDs Fabricated by Parallel Fringe Field Method", Sid 93 Digest, 269–217 (1993).

T. Fiske, "P–32: Characterizations of Viewing–Angle–Dependent Colorimetric and Photometric Performance of Color LCDs", Sid 3 Digest, 565–567 (1993).

A. Abileah et al., "P–55: Optical Performances of Normally White and Normallly Black Active–Matrix LCDs", Sid 3 Digest, 646–649 (1993).

H. Ong, "P–58: Negative–Birefringence Film–Compensated Multi–Domain TN–LCDs with Improved Symmetrical Optical Performance", Sid 93 Digest, 658–661 (1993).

Three–Dimensional Refractive Index Controlling Retardation Film.

Sumitomo Chemical's Optical Films (Sep. 1992).

Aclar® Performance Films, AlliedSignal Inc. (1987).

*Primary Examiner*—Wael M. Fahmy
*Assistant Examiner*—Fetsum Abraham
*Attorney, Agent, or Firm*—Roger H. Criss; Melanie L. Brown; Colleen D. Szuch

[57] ABSTRACT

The present invention provides an optical phase retardation film comprising a polymer comprising at least about 40 percent by weight chlorotrifluoroethylene. The present invention also provides an optical phase retardation film comprising a halogen-containing polymer wherein: (a) the film has refractive indices $n_x$, $n_y$, and $n_z$ associated with its axes x, y, and z: (b) the x and y axes are in the plane of the film and perpendicular to each other; (c) the z axis is perpendicular to the plane of the film; and (d) $n_x \geq n_y > n_z$. The optical phase retardation film is useful in a liquid crystal display device. The present invention also provides a liquid crystal display device comprising: (a) a first polarizer; (b) liquid crystal cell having transparent electrodes; (c) an optical phase retardation film comprising a polymer comprising at least about 40 percent by weight chlorotrifluoroethylene; and (d) a second polarizer wherein the liquid crystal cell and optical phase retardation film are located between the first and second polarizers.

22 Claims, No Drawings

OPTICAL PHASE RETARDATION FILM

BACKGROUND OF THE INVENTION

The present invention relates to improved optical phase retardation films.

Direct view optical display devices based on liquid crystal materials have been extensively developed over the past two decades. One embodiment which is exemplary of such devices is the twisted nematic (TN) liquid crystal display device. In this embodiment, a nematic liquid crystal medium is sandwiched between substrates which are treated so as to cause spontaneous alignment of liquid crystal molecules parallel to the plane of the substrate. If the two substrates are oriented so that alignment at each substrate differs by 90 degrees, then the liquid crystal molecules will undergo a 90 degree orientation change throughout the thickness of the medium. For reasonable spacing of the substrates (typically about 5 micrometers), this configuration has the property of rotating the polarization of light incident normal to the plane of the substrates by 90 degrees. If an electric potential is applied between the substrates (typically a few volts), then the order of the liquid crystal molecules is altered. In the presence of the potential, the molecules will tend to align perpendicular to the substrate and the 90 degree rotation will be destroyed. Thus the polarization of light incident normal to the surface of the substrate will be unaltered in the presence of the electric potential. Based on these principles, direct view twisted nematic (TN) liquid crystal devices may be constructed which are normally black (NB) in the absence of the potential or which are normally white (NW) in the absence of the potential.

As an example, a typical normally white display consists of a TN liquid crystal cell as described above fitted with polarizing elements on either side of the cell so that unpolarized light incident normal to the plane of the device is linearly polarized as it enters the device. The polarization is rotated by 90 degrees as the light transverses the cell. The light is then transmitted by the second polarizing element which is oriented at 90 degrees to the first polarizing element. Thus in the absence of an electric potential, light incident normal to the device is transmitted through the structure. When an electric potential is applied between the substrates, the media no longer rotates the polarization by 90 degrees. Thus light which is incident normal to the structure is rejected by the second polarizer and not transmitted. In this way, image information contained in the pattern of applied electric potential is presented as a decrease in light as seen by the viewer. This is the operating principle of a simple twisted nematic normally white (NW) display.

A key property of optical display devices is optical contrast, that is, the ratio of the light intensity in the "light on" state (for a NW display, the state with no potential applied) to the light intensity in the "light off" state (for a NW display, the state with the maximum potential applied). High contrast is important since the higher the contrast, the more readily the viewer will be able to distinguish between the two states. For viewing normal to the viewing screen, TN liquid crystal devices are capable of very high contrast (200:1 or more depending on the quality of the polarizers and other optical factors). However for viewing at an angle other than normal to the viewing screen, the contrast of simple TN devices is known to degrade significantly. For a normally white (NW) display, this is primarily due to the fact that rays of light which pass at an angle through the cell in the "light off" state (potential applied) experience a conversion from linear to elliptical polarization due to the greater refractive index perpendicular to the substrates that is $n_z > n_x$, $n_y$. This conversion is well known in the field of optics and depends on the magnitude of the birefringence (the change in refractive index, $\delta n$); the thickness of the liquid crystal cell, d; and the incident angle. The elliptical character, i.e. components of both polarization directions, of the polarization allows light propagating at an angle other than normal to the viewing screen to escape through the second polarizer, and thus, lowers the ratio of light transmitted without the potential applied to that transmitted when the potential is applied.

Previous attempts to increase viewing angle, color purity, and contrast have involved the production of multi-domain liquid crystal cells (A. Lien et al., "Two-Domain TN-LCDs Fabricated by Parallel Fringe Field Method", SID 93 DIGEST, 269–271 (1993)) and the use of compensation cells (T. Nagatsuka et at., "Retardation Film for LCDs", Proceedings of the SID, 32/2, 125–131 (1991)), positive-birefringence films, negative-birefringence films (H. Ong, "Negative-Birefringence Film-Compensated Multi-Domain TN-LCDs with Improved Symmetrical Optical Performance", SID 93 DIGEST, 658–661 (1993)), laminates of multiple birefringence films (T. Nagatsuka et al., supra) and combinations of these and other techniques. No single technique has resolved any of these issues in a totally satisfactory manner, and the best results have been achieved with processes which involve difficulties in manufacture. A need for a simple process to enhance viewing angle both horizontally and vertically still exists. Additionally, a need exists for stability at a storage temperature of 125° C., particularly in avionics applications.

"Phase retarder" films which can approximately compensate for this phenomenon by providing for enhanced contrast over a wider range of viewing angles are known. These films have the property that they convert elliptically polarized light to linearly polarized light and therefore compensate the polarization caused by the liquid crystals in the off axis direction. For a twisted nematic (TN) normally white (NW) device, these films are characterized by a negative birefringence, that is the refractive index for light polarized perpendicular to the plane of the film is less than that for light polarized parallel to the plane of the film. In this way, the film can compensate for the changes in polarization induced by the liquid crystal. These films are typically placed between the liquid crystal cell and at least one polarizer. The conversion depends upon the magnitude of the birefringence, $\delta N$; the thickness, D; and the viewing angle. Thus, the mathematical condition for compensation is approximately $-(\delta n)d = (\delta N)D$ wherein $\delta n$ is the birefringence of the liquid crystal, d is the thickness of the liquid crystal, $\delta N$ is the birefringence of the film, and D is the thickness of the film. For a typical NW liquid crystal display, $\delta n$ is about 0.06 and d is about 5 micrometers and thus the phase retarder requires typically $(\delta N)D$ about 0.3 micrometers.

A number of polymeric materials, which may be produced in film form, are taught to be useful as "phase retarder" films. For example, U.S. Pat. Nos. 4,385,806; 4,844,569, 5,061,042; 5,093,739; 5,121,238; 5,124,824; 5,138,474; 5,189,538; 5,245,456; and 5,249,071 teach that fluorine-containing resins, polyphenylene sulfide, polyvinyl butyral, cellulose butyrate, cellulose acetate, polyvinyl chloride, polyacrylonitrile, polystyrene, polyolefins such as polyethylene and polypropylene, polyetheramide, diallylcarbonate, polyamide, polyphenyleneoxide, acrylic ester polymers, methacrylic ester polymers, methacrylonitrile polymers, polysulphones, polyethylene naphthalates, polyether sulphones, polyether ether ketones, polyethylene terephthalate (PET) and blends, phenoxy ethers, norboranes, polycarbonate (PC), polymethyl methacrylate (PMMA) and blends, polystyrene blends with polymethyl methacrylate and with polycarbonates, aromatic polyesters, amorphous polyesters, polyvinylidene fluoride blends with PMMA, polyvinyl alcohol, polyimides, and cellulose diacetates are useful as phase retarder films.

U.S. Pat. No. 5,061,042 teaches that uniaxially stretched thermoplastic films are useful phase retarders and that the films may be uniaxially stretched by preheating, stretching, and heat setting. As noted in U.S. Pat. No. 5,061,042, it is most desirable to have a retardation value relating to the refractive index difference $n_x-n_y$ between 30 and 1200 nm. As will be explained more fully below, we have found that for some liquid crystal cells, it is desirable to have a retardation value relating to the index difference $n_x-n_z$ and $n_y-n_z$ between about 30 and about 500 nm.

U.S. Pat. No. 5,245,456 teaches that a film made of polycarbonate, polystyrene, poly(vinyl alcohol), cellulose acetate, polyester, polyarylate, or polyimide has refractive indices, $n_x$ and $n_y$, in two directions parallel to the film plane and crossing each other at right angles and a refractive index, $n_z$, in the direction of the thickness of the film wherein $n_x > n_z > n_y$. However, this relation between the refractive indices of the phase retardation film will not correct the change in polarization caused by propagation of light through the liquid crystal medium at an angle other than normal for all available liquid crystal materials. As will be explained more fully below, for some liquid crystalline materials, a phase retardation film that combines birefringence with negative optical anisotropy, that is, a film with refractive indices described by $n_x \geq n_y > n_z$, will more effectively compensate the birefringence with positive optical anisotropy of the liquid crystalline material and this will provide a liquid crystal display device with increased viewing angle and higher contrast.

PET and PC materials, which have been extensively utilized commercially, are of particular importance as phase retarder films because they have excellent optical and physical properties. Although PET and PC films have been widely applied as phase retarder films, they are severely deficient in several properties including dispersion (variation in optical properties such as δN with wavelength), poor optical transparency, poor weathering properties (degradation of optical properties upon exposure to ultraviolet light), and low use temperatures. Other known films are also characterized by one or more of these deficiencies or are not useful for other reasons.

As such, the need exists in the art for an optical phase retarder film having low dispersion, a high degree of optical clarity, excellent weatherability, and optical properties which are stable over a wide range of use temperatures.

SUMMARY OF THE INVENTION

We have discovered that films formed from polymers based on chlorotrifluoroethylene monomers provide properties suitable for use as a phase retarder. Films based on these materials extruded under controlled conditions provide negative birefringence as required for use as a phase retarder in NW TN liquid crystal displays and values of δ(N)D suitable for this purpose. Furthermore, we have discovered that these materials may be thermally treated to provide films with enhanced negative birefringence and with optical properties which are stable over a wide range of use temperatures. The resulting phase retarder films exhibit a high degree of optical clarity, very low dispersion, excellent weatherability, excellent chemical resistance, low moisture absorption, and usefulness over a wide range of use temperatures.

As such, the present invention provides an optical phase retardation film comprising a polymer comprising at least about 40 percent by weight chlorotrifluoroethylene.

The present invention also provides an optical phase retardation film comprising a halogen-containing polymer wherein: (a) the film has refractive indices $n_x$, $n_y$, and $n_z$ associated with its axes x, y, and z: (b) the x and y axes are in the plane of the film and perpendicular to each other; (c) the z axis is perpendicular to the plane of the film; and (d) $n_x \geq n_y > n_z$.

The present invention also provides a liquid crystal display device comprising: (a) a first polarizer; (b) liquid crystal cell having transparent electrodes; (c) an optical phase retardation film comprising a polymer comprising at least about 40 percent by weight chlorotrifluoroethylene; and (d) a second polarizer wherein the liquid crystal cell and optical phase retardation film are located between the first and second polarizers.

Other advantages of the present invention will be apparent from the following description and claims.

DETAILED DESCRIPTION OF PREFERRED EMBODIMENTS

The halogen-containing polymer used for the present optical phase retardation film is preferably a fluorine-containing polymer. The preferred fluorine-containing polymer is homopolymers and copolymers of chlorotrifluoroethylene. The chlorotrifluoroethylene film forming resin may include ethylene or an ethylene compound containing fluoride such as fluorinated α-olefins including hexafluoropropylene, hexafluoroisobutylene, vinylidene fluoride, and tetrafluoroethylene; fluorinated ethers such as perfluoroalkyl vinyl ethers including perfluoropropyl vinyl ether; and perfluoroalkyl ethylenes including perfluorobutyl ethylene, and copolymers and blends thereof. For purposes of the present invention, copolymers also include polymers having three or more monomer components as well as copolymers having two monomer components.

Preferred polychlorotrifluoroethylene films include homopolymers and copolymers of chlorotrifluoroethylene. The more preferred polychlorotrifluoroethylene films are commercially available from AlliedSignal Inc., Morristown, N.J. as Aclar® film or Halar® film as indicated in the following Table I:

TABLE I

| | |
|---|---|
| Aclar ® RX160 Film | Homopolymer of Chlorotrifluoroethylene |
| Aclar ® 22A Film | Copolymer of Chlorotrifluoroethylene and 3–4 weight percent Vinylidene Fluoride |
| Aclar ® 88A Film | Copolymer of Chlorotrifluoroethylene and 3–4 weight percent Vinylidene Fluoride |
| Aclar ® 33C Film | Terpolymer of Chlorotrifluoroethylene, ≦ 1 weight percent Vinylidene Fluoride, and ≦ 1 weight percent Tetrafluoroethylene |
| Halar ® Film | Copolymer of 60 weight percent Ethylene and 40 weight percent Chlorotrifluoroethylene |

Useful film may be produced in accordance with conventional processes which include a variety of process techniques and a variety of reaction systems. Such processes include bulk polymerization via the utilization of one or more peroxides as an initiating system; aqueous suspension polymerization with redox-initiator systems which include one or more alkali metal persulfates as an oxidant, one or more alkali metal bisulfites as activators, and metal salts as accelerators; and emulsion polymerization utilizing fluorocarbon and chlorofluorocarbon emulsifiers.

One suitable process, a reduction-oxidation type reaction, comprises the steps of charging a sufficient quantity of the starting chlorotrifluoroethylene monomer reactant to a glass lined, jacketed, stirred sealable reactor which is capable of operating at least to pressures of about 200 psig. The reactor may include a cooling jacket or other cooling means which withdraws heat from the reactor during the polymerization process and thereby provides a means of temperature control during the reaction of the reactor contents.

The reaction system requires the use of an initiator/catalyst system to produce the polychlorotrifluoroethylene film forming resin from chlorotrifluoroethylene monomer. Such an initiator/catalyst system comprises reduction, oxidation, and acceleration constituents wherein the oxidation constituents provide free radicals for the initiation of the polymerization of the chlorotrifluoroethylene. By way of example, suitable reduction constituents include at least one of an alkali metal bisulfate and alkali metal persulfate. Suitable oxidation constituents include at least one of the following: hydrogen peroxide, and various metallic persulfates, including sodium persulfate and potassium persulfate, as well as ammonium persulfite. Suitable acceleration constituents include at least one of the following: variable valence metal salts such as ferrous sulphate, silver nitrate, and copper sulfate. Varying ratios of these constituents may be used. Other processes and systems suitable for the production of polychlorotrifluoroethylene film forming and copolymer resins are described in U.S. Pat. Nos. 2,569,524; 2,689,241; 2,700,622; 2,705,706; 2,783,219; 2,820,026; 3,632,847; 3,640,985; 3,642,754; and 3,671,510 which are incorporated herein by reference.

Film useful in the present invention may be formed by any conventional film forming technique. Such film-forming techniques include: formation of films by casting the film onto a casting roll after extrusion through a flat film-forming die, formation of films by the "blown film" technique wherein a film-forming composition is forced through a circular die and the exiting circular film profile is expanded by compressed air, casting a film-forming composition into a billet or other solid form and subsequently skiving the film from the formed billet, as well as other techniques not particularly described here. Of these techniques, preferred methods for the production of film include film casting techniques and the production of film by blown film techniques. The most preferred is the formation of films by conventional film casting techniques involving extrusion.

The present film has a thickness of preferably between about 10 microns and about 100 microns, preferably of between about 10 microns and about 50 microns, and most preferably of between about 15 microns and about 40 microns.

Film may be produced by blown film techniques as well as by extrusion forming of film wherein the film-forming composition as described above is provided to the inlet of an extruder wherein the action of heat and mechanical work performed upon the film-forming composition plasticizes the film and afterwards the composition is forced through a flat film-forming die. The film exiting the film-forming die is then quickly contacted with a chilled casting roll which is maintained at a temperature of less than about 38° C., and preferably less than about 27° C. in order to quench the film and reduce the formation of crystallites within the film. To assure good contact of the extruded film and the chilled casting roll, the use of mechanical means (such as an idler roll, or a plurality of chilled rolls), or other inducement means (such as the use of an air knife or air blower) for inducing the contact of the film and the chilled casting roll may be used to urge and maintain the contact of the film with the chilled casting roll.

The polychlorotrifluoroethylene film removed from the chilled casting roll is an unoriented mostly amorphous film. It may be removed and wound onto a core or spool.

The most preferred polychlorotrifluoroethylene films are homopolymers and copolymers of chlorotrifluoroethylene which are heat treated in order to enhance the thermal stability of the optical properties of the films. The heat stabilized films are suitable for use or storage up to about 125° C. Preferably, for use or storage at a temperature $T_1$, one heat treating method involves heating the film to at least temperature $T_1$ and maintaining the film at $T_1$ for about 0.1 to about 12 hours.

Another preferable heat treating method involves: (a) heating the film to a temperature $T_2$ of at least about 100° C. and maintaining the film at temperature $T_2$ at a pressure of about 2 to about 2000 psi for about 0.1 to about 8 hours; (b) cooling the film at about 1° C./second to a temperature $T_3$ below 40° C.; and (c) maintaining the film at a temperature $T_4$ where $T_3 \leq T_4 < T_2$ at a pressure of about 2 to about 2000 psi for about 0.1 to about 12 hours. More preferably, the heat treating method involves: (a) heating the film to a temperature $T_2$ between about 100° C. and about 180° C. and maintaining the film at temperature $T_2$ at a pressure of about 200 to about 1200 psi for about 0.1 to about 3 hours; (b) cooling the film at about 5° C./second to a temperature $T_3$ below 30° C.; and (c) maintaining the film at a temperature $T_4$ where $T_3 \leq T_4 < T_2$ at a pressure of about 200 to about 1200 psi for about 0.5 to about 8 hours. Most preferably, the heat treating method involves: (a) heating the film to a temperature $T_2$ between about 140° C. and about 160° C. and maintaining the film at temperature $T_2$ at a pressure of about 400 to about 800 psi for about 0.5 to about 2 hours; (b) cooling the film at about 5° C./second to a temperature $T_3$ below 10° C.; and (c) maintaining the film at a temperature $T_4$ where $T_3 \leq T_4 < T_2$ at a pressure of about 400 to about 800 psi for about 1 to about 4 hours.

The present optical phase retardation film improves the viewing angle and contrast of the liquid crystal display device. Additionally, the film does not distort the colors of the display and is suitable for use at temperatures of up to about 125° C.

To assemble a liquid crystal display device having the present optical phase retardation film therein, a commercially available nematic liquid crystal medium is sandwiched between two substrates which have been treated so as to cause spontaneous alignment of the liquid crystal molecules, and which are oriented such that they induce a 90 degree orientation change throughout the thickness of the material. This twisted nematic cell is patterned with transparent electrodes and connected to appropriate controlling electronics. A commercially available first polarizer is adhered to the surface of the cell on which light is incident such that its optical axis is parallel to the liquid crystal orientation nearest the polarizer. The optical phase retardation film of this invention is uniformly adhered to the surface of the liquid crystal cell opposite the direction of the light source. A commercially available second polarizer is then adhered to the optical phase retardation film such that its optical axis is oriented perpendicular to the optical axis of the first polarizer and parallel to the liquid crystal orientation nearest the second polarizer. The optical retardation film may also be placed between the first polarizer and the liquid crystal cell.

The liquid crystal display device may be used in a wide range of applications which include computer terminals, airplane cockpit displays, automotive instrument panels, televisions and other devices which provide text, graphics, or video information. The liquid crystal display device may be used in normally black and normally white devices.

The present invention is more fully illustrated by the following non-limiting Examples.

EXAMPLES 1–5

The refractive indices of Aclar® 22A, Aclar® 88A, Aclar® RX160, Aclar® 33C and Halar® film from Allied-Signal, Inc., Morristown, N.J., were measured using a Metricon 2000 Prism lo Coupler equipped with a 632.8 nm HeNe laser with polarization perpendicular to the sample surface. The results are in Table II below. The relationship between the refractive indices of the present film is $n_x \geq n_y > n_z$, and the magnitude of the retardation value is 10 nm<$|\delta n * d|$<800 nm, where d is the thickness of the film in nm.

EXAMPLES 16–20

The previously annealed Aclar® 88A film from Examples 8–12 was placed between two sheets of 2 mil polyimide film and placed on a 0.25" aluminum base plate. Along each edge of the layered films was placed a 4 mil metal shim, and then a 0.25" aluminum top plate was placed on top. The assembly was placed in a thermal press that had been pre-heated to the desired annealing temperature and the desired pressure was applied. After the specified time, the assembly was removed from the thermal press and immediately quenched in a 5° C. bath. The refractive indices were measured as described for Examples 1–5 above, and the results are presented in Table IV below.

TABLE II

| Example | Film | thickness (micron) | nx | ny | nz | $|\delta n(xz)*d|$ | $|\delta n(yz)*d|$ | $|\{\delta n(xz) + \delta n(yz)\}*d|$ |
|---|---|---|---|---|---|---|---|---|
| 1 | Aclar ® 22A | 38.2 | 1.431 | 1.428 | 1.426 | 192 | 76 | 266 |
| 2 | Aclar ® 88A | 19.1 | 1.431 | 1.428 | 1.426 | 96 | 38 | 133 |
| 3 | Aclar ® RX160 | 15.2 | 1.434 | 1.430 | 1.428 | 91 | 30 | 122 |
| 4 | Aclar ® 33C | 19.1 | 1.439 | 1.429 | 1.413 | 497 | 306 | 802 |
| 5 | Halar ® Film | 25.4 | 1.456 | 1.449 | 1.444 | 305 | 127 | 432 |

EXAMPLES 6–15

Aclar® 88A (thickness 19.1 microns) film from Allied-Signal Inc. was placed between two sheets of 2 mil polyimide film and placed on a 0.25" aluminum base plate. Along each edge of the layered films was placed a 4 mil metal shim, and a 0.25" aluminum top plate was placed on top. The assembly was placed in a thermal press that had been pre-heated to the desired annealing temperature and the desired pressure was applied. After the specified time, the assembly was removed from the thermal press and immediately quenched in a 5° C. bath. The refractive indices were measured as described for Examples 1–5 above, and the results are presented in Table III below.

TABLE III

| Example | anneal time and pressure (psi) | anneal temp (°C.) | nx | ny | nz | $|\delta n(xz)*d|$ | $|\delta n(yz)*d|$ | $|\{\delta n(xz) + \delta n(yz)\}*d|$ |
|---|---|---|---|---|---|---|---|---|
| 6 | N/A | N/A | 1.431 | 1.428 | 1.426 | 168 | 53 | 221 |
| 7 | 2 h, 400 | 85 | 1.437 | 1.430 | 1.429 | 152 | 19 | 171 |
| 8 | 2 h, 400 | 100 | 1.440 | 1.431 | 1.429 | 210 | 38 | 210 |
| 9 | 2 h, 400 | 125 | 1.443 | 1.431 | 1.430 | 248 | 19 | 267 |
| 10 | 2 h, 400 | 150 | 1.444 | 1.432 | 1.431 | 248 | 19 | 267 |
| 11 | 2 h, 400 | 170 | 1.444 | 1.431 | 1.430 | 267 | 19 | 286 |
| 12 | 17 h, 500 | 175 | 1.442 | 1.431 | 1.429 | 248 | 38 | 286 |
| 13 | 16 h, 1500 | 215 | 1.437 | 1.436 | 1.435 | 38 | 19 | 57 |
| 14 | 23 h, 200 | 145 | 1.444 | 1.433 | 1.429 | 287 | 76 | 363 |
| 15 | 2 h, 2000 | 125 | 1.440 | 1.430 | 1.428 | 229 | 38 | 267 |

TABLE IV

| Example | first anneal temp (°C.) | second anneal temp (°C.) | second anneal time and pressure (psi) | nx | ny | nz | |δn(xz)|*dl | |δn(yz)|*dl | |{δn(xz) + δn(yz)}*dl |
|---|---|---|---|---|---|---|---|---|---|
| 16 | 100 | 125 | 7.5 h, 400 | 1.442 | 1.432 | 1.431 | 210 | 19 | 229 |
| 17 | 125 | 125 | 7.5 h, 400 | 1.444 | 1.431 | 1.431 | 248 | 0 | 248 |
| 18 | 150 | 125 | 7.5 h, 400 | 1.445 | 1.431 | 1.430 | 287 | 19 | 306 |
| 19 | 170 | 125 | 7.5 h, 400 | 1.446 | 1.433 | 1.432 | 267 | 19 | 286 |
| 20 | 175 | 125 | 6 h, 200 | 1.445 | 1.433 | 1.430 | 287 | 57 | 344 |

EXAMPLE 21

Aclar® 33C (thickness 19.1 microns) film from Allied-Signal Inc. was placed between two sheets of 2 mil polyimide film and placed on a 0.25" aluminum base plate. Along each edge of the layered films was placed a 4 mil metal shim, and a 0.25" aluminum top plate was placed on top. The assembly was placed in a thermal press that had been pre-heated to the desired annealing temperature and the desired pressure was applied. After the specified time, the assembly was removed from the thermal press and immediately quenched in a 5° C. bath. The refractive indices were measured as described for Examples 1–5 above, and the results are presented in Table V below.

EXAMPLE 22

Aclar®RX160 (thickness 15.2 microns) film from Allied-Signal Inc. was placed between two sheets of 2 mil polyimide film and placed on a 0.25" aluminum base plate. Along each edge of the layered films was placed a 4 mil metal shim, and a 0.25" aluminum top plate was placed on top. The assembly was placed in a thermal press that had been pre-heated to the desired annealing temperature and the desired pressure was applied. After the specified time, the assembly was removed from the thermal press and immediately quenched in a 5° C. bath. The refractive indices were measured as described for Examples 1–5 above, and the results are presented in Table V below.

EXAMPLE 23

Aclar® 22A (thickness 38.2 microns) film from Allied-Signal Inc. was placed between two sheets of 2 mil polyimide film and placed on a 0.25" aluminum base plate. Along each edge of the layered films was placed a 4 mil metal shim, and a 0.25" aluminum top plate was placed on top. The assembly was placed in a thermal press that had been pre-heated to the desired annealing temperature and the desired pressure was applied. After the specified time, the assembly was removed from the thermal press and immediately quenched in a 5° C. bath. The refractive indices were measured as described for Examples 1–5 above, and the results are presented in Table V below.

EXAMPLE 24

A nematic liquid crystal media was sandwiched between two substrates which had been treated so as to cause spontaneous alignment of the liquid crystal molecules, and which were oriented such that they induced a 90 degree orientation change throughout the thickness of the material. This twisted nematic cell was patterned with transparent electrodes and connected to appropriate controlling electronics. A first polarizer was adhered to the surface of the cell on which light is incident such that its optical axis was parallel to the liquid crystal orientation nearest the polarizer. The optical phase retardation film of Example 1 above was uniformly adhered to the surface of the liquid crystal cell opposite the direction of the light source. A second polarizer was then adhered to the optical phase retardation film such that its optical axis was oriented perpendicular to the optical axis of the first polarizer and parallel to the liquid crystal orientation nearest the second polarizer. This display device had markedly greater contrast and viewing angle performance than a similar device which did not include the optical phase retardation film.

EXAMPLE 25

A nematic liquid crystal medium was sandwiched between two substrates which had been treated so as to cause spontaneous alignment of the liquid crystal molecules, and which were oriented such that they induced a 90 degree orientation change throughout the thickness of the material. This twisted nematic cell was patterned with transparent electrodes and connected to appropriate controlling electronics. The optical phase retardation film of Example 1 above was uniformly adhered to the surface of the liquid crystal cell nearest the light source. A first polarizer was adhered to the optical phase retardation film on the side nearest the light source such that the polarizer optical axis was parallel to the liquid crystal orientation nearest the polarizer. A second polarizer was then adhered to the opposite side of the liquid crystal cell such that its optical axis was oriented perpendicular to the optical axis of the first polarizer and parallel to the liquid crystal orientation nearest the second polarizer. This display device had markedly

TABLE V

| Example | anneal time and pressure (psi) | anneal temp (°C.) | nx | ny | nz | |δn(xz)|*dl | |δn(yz)|*dl | |{δn(xz) + δn(yz)}*dl |
|---|---|---|---|---|---|---|---|---|
| 21 | 2 h, 400 | 150 | 1.440 | 1.437 | 1.431 | 172 | 114 | 286 |
| 22 | 2 h, 400 | 150 | 1.448 | 1.435 | 1.434 | 213 | 15 | 228 |
| 23 | 16 h, 1500 | 215 | 1.437 | 1.435 | 1.434 | 114 | 38 | 152 | greater contrast and viewing angle performance than a

What is claimed is:

1. An optical phase retardation film for a liquid crystal display comprising a polymer comprising at least about 40 percent by weight chlorotrifluoroethylene.

2. The optical phase retardation film of claim 1 wherein said film has a thickness of about 10 to about 100 microns.

3. The optical phase retardation film of claim 1 wherein said polymer comprises 100 percent by weight of said chlorotrifluoroethylene or copolymers of said chlorotrifluoroethylene and at least one comonomer selected from the group consisting of hexafluoropropylene, hexafluoroisobutylene, vinylidene fluoride, tetrafluoroethylene, perfluoropropyl vinyl ether, perfluorobutyl ethylene, and ethylene.

4. The optical phase retardation film of claim 1 wherein said polymer comprises 100 percent by weight of said chlorotrifluoroethylene or copolymers of said chlorotrifluoroethylene and at least one comonomer selected from the group consisting of vinylidene fluoride, tetrafluoroethylene, and ethylene.

5. The optical phase retardation film of claim 1 wherein said film is heat stabilized for use or storage at temperature $T_1$ by heating said film to at least said temperature $T_1$ and maintaining said film at said temperature $T_1$ for about 0.1 to about 12 hours.

6. The optical phase retardation film of claim 1 wherein said film is heat stabilized by:

(a) heating said film to a temperature $T_2$ of at least about 100° C. and maintaining said film at said temperature $T_2$ at a pressure of about 2 to about 2000 psi for about 0.1 to about 8 hours;

(b) cooling said film at least at about 1° C./second to a temperature $T_3$ below 40° C.; and (c) maintaining said film at a temperature $T_4$ wherein $T_3 \leq T_4 < T_2$ at a pressure of about 2 to about 2000 psi for about 0.1 to about 12 hours.

7. An optical phase retardation film for a liquid crystal display comprising a halogen-containing polymer wherein:

(a) said film has refractive indices $n_x$, $n_y$, and $n_z$ associated with its axes x, y, and z:

(b) said x and y axes are in the plane of said film and perpendicular to each other;

(c) said z axis is perpendicular to the plane of said film; and (d) $n_x \geq n_y > n_z$.

8. The optical phase retardation film of claim 7 wherein said film has a thickness of about 10 to about 100 microns.

9. The optical phase retardation film of claim 7 wherein said halogen-containing polymer is a fluorine-containing polymer.

10. The optical phase retardation film of claim 7 wherein said polymer comprises polychlorotrifluoroethylene or copolymers of chlorotrifluoroethylene and at least one comonomer selected from the group consisting of hexafluoropropylene, hexafluoroisobutylene, vinylidene fluoride, tetrafluoroethylene, perfluoropropyl vinyl ether, perfluorobutyl ethylene, and ethylene.

11. The optical phase retardation film of claim 7 wherein said polymer comprises polychlorotrifluoroethylene or copolymers of chlorotrifluoroethylene and at least one comonomer selected from the group consisting of vinylidene fluoride, tetrafluoroethylene, and ethylene.

12. The optical phase retardation film of claim 7 wherein said film is heat stabilized for use or storage at temperature $T_1$ by heating said film to at least said temperature $T_1$ and maintaining said film at said temperature $T_1$ for about 0.1 to about 12 hours.

13. The optical phase retardation film of claim 7 whereto said film is heat stabilized by:

(a) heating said film to a temperature $T_2$ of at least about 100° C. and maintaining said film at said temperature $T_2$ at a pressure of about 2 to about 2000 psi for about 0.1 to about 8 hours;

(b) cooling said film at least at about 1° C./second to a temperature $T_3$ below 40° C.; and (c) maintaining said film at a temperature $T_4$ wherein $T_3 \leq T_4 < T_2$ at a pressure of about 2 to about 2000 psi for about 0.1 to about 12 hours.

14. A liquid crystal display device comprising:

(a) a first polarizer;

(b) liquid crystal cell having transparent electrodes;

(c) an optical phase retardation film comprising a polymer comprising at least about 40 percent by weight chlorotrifluoroethylene; and (d) a second polarizer wherein said liquid crystal cell and said optical phase retardation film are located between said first and second polarizers.

15. The liquid crystal display device of claim 14 wherein said optical phase retardation film is located between said first polarizer and said liquid crystal cell.

16. The liquid crystal display device of claim 14 wherein said optical phase retardation film is located between said liquid crystal cell and said second polarizer.

17. The liquid crystal display device of claim 14 wherein said film has refractive indices $n_x$, $n_y$, and $n_z$ associated with its axes x, y, and z wherein:

(i) said x and y axes are in the plane of said film and perpendicular to each other;

(ii) said z axis is perpendicular to the plane of said film; and (iii) $n_x \geq n_y > n_z$.

18. The liquid crystal display device of claim 14 wherein said film has a thickness of about 10 to about 100 microns.

19. The liquid crystal display device of claim 14 wherein said polymer comprises 100 percent by weight of said chlorotrifluoroethylene or copolymers of said chlorotrifluoroethylene and at least one comonomer selected from the group consisting of hexafluoropropylene, hexafluoroisobutylene, vinylidene fluoride, tetrafluoroethylene, perfluoropropyl vinyl ether, perfluorobutyl ethylene, and ethylene.

20. The liquid crystal display device of claim 14 wherein said polymer comprises 100 percent by weight of said chlorotrifluoroethylene or copolymers of said chlorotrifluoroethylene and at least one comonomer selected from the group consisting of vinylidene fluoride, tetrafluoroethylene, and ethylene.

21. The liquid crystal display device of claim 14 wherein said film is heat stabilized for use or storage at temperature $T_1$ by heating said film to at least said temperature $T_1$ and maintaining said film at said temperature $T_1$ for about 0.1 to about 12 hours.

22. The liquid crystal display device of claim 14 wherein said film is heat stabilied by:

(a) heating said film to a temperature $T_2$ of at least about 100° C. and maintaining said film at said temperature $T_2$ at a pressure of about 2 to about 2000 psi for about 0.1 to about 8 hours;

(b) cooling said film at least at about 1° C./second to a temperature $T_3$ below 40° C.; and (c) maintaining said film at a temperature $T_4$ wherein $T_3 \leq T_4 < T_2$ at a pressure of about 2 to about 2000 psi for about 0.1 to about 12 hours.

* * * * *